(12) United States Patent
Limatibul

(10) Patent No.: US 11,167,534 B2
(45) Date of Patent: Nov. 9, 2021

(54) POLYMER BARRIER LIMINATE TUBE FOR CONTAINER

(71) Applicant: KIMPAI LAMITUBE CO., LTD., Bangkok (TH)

(72) Inventor: Sumet Limatibul, Bangkok (TH)

(73) Assignee: KIMPAI LAMITUBE CO., LTD., Bangkok (TH)

( * ) Notice: Subject to any disclaimer, the term of this patent is extended or adjusted under 35 U.S.C. 154(b) by 386 days.

(21) Appl. No.: 16/080,218

(22) PCT Filed: Feb. 17, 2017

(86) PCT No.: PCT/TH2017/000011
§ 371 (c)(1),
(2) Date: Aug. 27, 2018

(87) PCT Pub. No.: WO2018/070945
PCT Pub. Date: Apr. 19, 2018

(65) Prior Publication Data
US 2019/0016100 A1 Jan. 17, 2019

(30) Foreign Application Priority Data
Oct. 11, 2016 (TH) .................. 1601006127

(51) Int. Cl.
| | | |
|---|---|---|
| *B32B 27/08* | (2006.01) | |
| *B32B 27/28* | (2006.01) | |
| *B32B 27/32* | (2006.01) | |
| *B32B 27/30* | (2006.01) | |
| *B32B 27/36* | (2006.01) | |
| *B32B 7/12* | (2006.01) | |
| *B32B 27/34* | (2006.01) | |

(52) U.S. Cl.
CPC .............. *B32B 27/08* (2013.01); *B32B 7/12* (2013.01); *B32B 27/28* (2013.01); *B32B 27/306* (2013.01); *B32B 27/32* (2013.01); *B32B 27/34* (2013.01); *B32B 27/36* (2013.01); *B32B 2250/246* (2013.01); *B32B 2307/31* (2013.01); *B32B 2307/514* (2013.01); *B32B 2307/7244* (2013.01); *B32B 2323/10* (2013.01); *B32B 2439/62* (2013.01); *Y10T 428/139* (2015.01); *Y10T 428/1352* (2015.01); *Y10T 428/1393* (2015.01)

(58) Field of Classification Search
CPC ......... B32B 27/08; B32B 27/28; B32B 27/32; B32B 27/306; B32B 27/36; B32B 27/34; B32B 7/12; B32B 2250/246; B32B 2307/31; B32B 2307/7244; B32B 2323/10; B32B 2439/62; B32B 2307/514; B32B 2439/02; B32B 2439/70; B32B 2439/60; B32B 2439/46; B32B 2439/06; B32B 2307/7246; B32B 2307/72; B32B 2307/732; B32B 2307/546; B32B 2307/7248; B32B 2439/80; B32B 2597/00; B32B 2250/05; B32B 2250/40; B32B 2250/24; B32B 2270/00; B32B 1/08; B32B 7/04; B32B 7/02; Y10T 428/139; Y10T 428/1393; Y10T 428/1352
See application file for complete search history.

(56) References Cited

U.S. PATENT DOCUMENTS

| | | | | |
|---|---|---|---|---|
| 5,913,449 A | * | 6/1999 | Branch ................ | B65D 35/12 220/677 |
| 7,029,734 B1 | | 4/2006 | Wuest et al. | |
| 7,794,848 B2 | * | 9/2010 | Breese ................ | B32B 27/30 428/515 |
| 2013/0266751 A1 | | 10/2013 | Schneider et al. | |

FOREIGN PATENT DOCUMENTS

| | | |
|---|---|---|
| CN | 102001486 A | 4/2011 |
| CN | 102020056 A | 4/2011 |
| JP | 2004-243523 A | 9/2004 |
| JP | 2006-264940 A | 10/2006 |
| JP | 2007-8584 A | 1/2007 |
| JP | 2008-74452 A | 4/2008 |
| JP | 2010-143008 A | 7/2010 |
| JP | 2010-162866 A | 7/2010 |
| JP | 5653744 B2 | 1/2015 |
| JP | 2015-74176 A | 4/2015 |
| WO | 01/94105 A1 | 12/2001 |
| WO | 2008/091321 A1 | 7/2008 |
| WO | 2012/160436 A1 | 11/2012 |

OTHER PUBLICATIONS

International Search Report (ISR) dated Sep. 1, 2017 for Application No. PCT/TH2017/000011.
Espacenet English abstract of CN 102020056 A.
Espacenet English abstract of CN 102001486 A.
Espacenet English abstract of JP 2012-131536 A which corresponds to JP 5653744 B2.
Espacenet English abstract of JP 2006-264940 A.
Espacenet English abstract of JP 2004-243523 A.
Espacenet English abstract of JP 2007-8584 A.
Espacenet English abstract of JP 2010-143008 A.
Espacenet English abstract of JP 2008-74452 A.
Espacenet English abstract of JP 2010-162866 A.
Espacenet English abstract of JP 2015-74176 A.

* cited by examiner

*Primary Examiner* — James C Yager
(74) *Attorney, Agent, or Firm* — Ladas & Parry LLP

(57) ABSTRACT

It is related to a packaging tube in which a laminate body uses a multilayer barrier film having an ethylene copolymer and a vinyl alcohol (EVOH) layer, and this tube can be used for contents such as cosmetics, hair-dye products, toothpastes, pharmaceutical creams, and so on. It is to provide a bounce-back property, preservation of contents and a flavor barrier property to a tube by forming a tube body from a laminate comprising an inner layer of a polyolefin resin, an intermediate layer of a gas-barrier resin and an outer layer of a polyolefin resin.

6 Claims, No Drawings

POLYMER BARRIER LIMINATE TUBE FOR CONTAINER

RELATED APPLICATION

This application is an application under 35 U.S.C. 371 of International Application No. PCT/TH2017/000011 filed on Feb. 17, 2017, the entire contents of which are incorporated herein by reference.

FIELD OF THE INVENTION

This present invention is in the field of materials science and relates to a polymer barrier laminate tube for a container.

BACKGROUND ART

Collapsible aluminium tubes, glass bottles, plastic containers, etc. are conventionally used as containers to protect deterioration of contents and flavors. A packaging film must provide physical integrity in order to assure containment of the product and ability to be processed in packaging machines. The term "physical integrity" applies to structural integrity of the packaging film itself.

At least one outer polyolefin layer as mentioned above usually provides necessary stability of the packaging film, and furthermore generally allows printing thereon or allows other external designs. For example, the film can be selected from polyethylene or polypropylene.

One barrier layer is provided in order to protect the packaging content from external environment, in particular from oxygen and water vapor, which can cause undesirable deterioration or spoilage of the packaging content. In addition, an aroma barrier property is considered for the barrier layer in order to prevent component loss. The barrier layer can preferably comprise ethylene vinyl alcohol or EVOH.

At least one inner polyethylene layer is preferably a sealable layer, i.e. a layer of a thermoplastic polymer, polyethylene or polypropylene.

U.S. Pat. No. 7,029,734 B1 discloses a multilayer packaging film, a package and a process for aseptic packaging applications. The multilayer packaging film includes (a) an inner sealing layer comprising polyolefin having a Vicat Softening Point greater than 90° C., (b) an oxygen barrier layer, and (c) an outer layer comprising a polymer layer selected from olefin polymers and polyester homopolymers or copolymers having silicone or a hydrogen-peroxide-resistant exterior coating, said outer layer having a Vicat Softening Point greater than 90° C.

JP Application No. 05-087637 discloses a laminate body, wherein each inner/outer layers is made of a composition of polyethylene having a density of 0.900-0.975 g/cm$^3$ and an ethylene-α-olefin copolymer, which is partially or entirely graft-modified with unsaturated carboxylic acid or its derivative.

An intermediate layer is made of an oxygen barrier resin. This heat-resistant squeezable tube-like cylindrical container comprising the inner, outer and intermediate layers is irradiated with electron beams. In the inner/outer layers, a mixing ratio of the ethylene-α-olefin copolymer to the polyethylene is 5-50% in weight ratio. An electron-beam absorption dose is 50-500 kGy. The oxygen barrier resin layer is a nylon or saponified ethylene-vinyl acetate copolymer layer. This laminate is made in order to reduce shrinkage accompanied with heating even at high temperature sterilization, and obtain excellent flexibility and oxygen barrier properties.

JP Application No. 2002-375154 discloses a laminated tube made from a multilayer barrier film constituted by successively laminating an inner layer comprising a heat-sealable resin, an aroma retaining layer comprising a cyclo olefin copolymer resin, an oxygen absorbing barrier layer containing an oxidizable polymer and a transition metal catalyst, and an outer layer comprising a biaxially stretched film. A package such as a pouch, a laminated tube or the like comprising the multilayer barrier film is also disclosed.

JP Application No. 2006-094653 discloses a laminated tube container providing at least a gas barrier laminate, wherein the gas barrier laminate comprises a base member and a gas barrier layer laminated on at least one surface of the base member. The gas barrier layer is made of a composite including a neutralization product having at least one functional group that is selected from a carboxyl group and a carboxylic acid anhydride group. At least a part of a —COO— group included in a least one functional group described above is neutralized with metal ions having two or more valences.

JP Application No. 2008-320946 discloses a laminated tube container maintaining oxygen barrier property and appearance even if subjected to severe handling and harsh retort treatment. The laminated tube container is formed by using a laminate including a base material and a gas barrier layer. The gas barrier layer is formed from a composition containing a hydrolytic condensate of at least one compound (L) containing a hydrolytic characteristic group, and a polymer (X) containing a carboxyl group and/or a carboxylic acid anhydride group. At least a part of a —COO— group of the polymer (X) is neutralized and/or reacted by a compound (P) containing two or more amino groups. At least a part of the —COO— group of the polymer (X) is neutralized by divalent or higher-valent metal ions. The ratio of [an equivalent of the amino group contained in the compound (P)]/[an equivalent of the —COO— group of the polymer (X)] is in the range of 0.2/100-20.0/100.

JP Application No. 2006-256565 discloses a tube container filled with hair cosmetic containing an aqueous medium containing ammonia and an oxidation dye, the container being excellent in oxygen barrier property, and resistant to the physical properties of the contents, and easy to squeeze. Said tube container filled with the hair cosmetic is formed from multiple layers of synthetic resins consisting of an innermost layer as a sealing layer (LDPE layer) and an outer layer as a water-resistant layer (LDPE layer). A fluorocarbon resin layer is formed as an intermediate layer, and the hair cosmetic contains the water medium containing ammonia and an oxidation dye. It is preferable that the multi-layer synthetic-resin layer has at least one polyamide layer (Ny layer). It may has at least one resin layer (EVOH layer) made of an ethylene-vinyl copolymer.

JP Application number 2009-229258 discloses a laminated tube container which is formed by using a laminate having a gas barrier layer. The gas barrier layer is composed of a composition containing a hydrolysis condensate of a compound (L) and a neutralized product of a polymer (X) containing a carboxyl group. The compound (L) includes a compound (A) containing M1 (Al or Ti or Zr) to which a characteristic group with a hydrolyzing property is bonded, and a compound (B) containing Si to which a characteristic group with a hydrolyzing property is bonded. A part of a —COO— group in the polymer (X) is neutralized by divalent or higher-valent metal ions. 80 mol % or more of the compound (B) is a compound expressed by a predetermined formula. A ratio of [the number of moles of M1 in the compound (A)]/[the number of moles of Si atom in the compound (B)] lies in the range between 0.1/99.9 and 35.0/65.0.

International Publication No. WO 2012/160436 discloses a polymer composition comprising: at least one low density polyethylene (LDPE); at least one linear low density polyethylene (LLDPE); and a nucleating agent in an amount in the range of 1.5% to 3.0% w/w of the total weight of the composition; wherein the low density polyethylene and the linear low density polyethylene are in a ratio in the range of 1:1 to 3:1 w/w. The present disclosure also provides a polyethylene film comprising the polymer composition. The present disclosure further provides a high clarity laminate comprising the polyethylene film. The present disclosure also provides a process for preparation of said laminate.

U.S. Application No. 2013/0266751 discloses a laminate film for production of a tube packaging having at least one plastics layer and also at least one barrier layer, wherein it is characterized in that the barrier layer is an oriented barrier layer, for example an EVOH layer.

JP Application No. 2013-212243 discloses a laminated tube container which is suitable for maintaining a gas barrier property possessed by a laminate film at a high level even when subjected to physical stress. A body part of the laminated tube is provided with the laminate film as a partition wall for partitioning the inside and the outside of the container and a dispensing part for dispensing the content stored in the inside, wherein the laminate film comprises a multilayer structure successively having a substrate (X) and one or more layers (Y) and layers (Z). The layer (Y) contains aluminum atoms, and the layer (Z) contains a polymer (E) containing monomer units having phosphorus atoms. In the multilayer structure, at least one pair of the layers (Y) and layers (Z) are adjacently laminated with each other.

SUMMARY OF THE INVENTION

In this invention, it is related to a packaging tube in which a laminate body uses a multilayer barrier film having an ethylene copolymer and a vinyl alcohol (EVOH) layer, and this tube can be used for contents such as cosmetics, hair-dye products, toothpastes, pharmaceutical creams, and so on.

An objective of the present invention is to provide a bounce-back property, preservation of contents and a flavor barrier property to a tube by forming a tube body from a laminate comprising an inner layer of a polyolefin resin, an intermediate layer of a gas-barrier resin and an outer layer of a polyolefin resin.

DETAILED DESCRIPTION

This invention described herein relates to a polymer (EVOH) barrier laminate having various total thicknesses in the range of 300-460 microns used for making a laminated tube. In one aspect of the laminate according to this invention, an extruded core layer of EVOH is sandwiched between extruded adhesive layers and extruded polyethylene layers. Thereafter, outer and inner polyethylene films are laminated in order to obtain a laminate sheet as a separate layer.

One embodiment of this invention is to provide a laminate comprising:

A. an outer polyolefin layer;

B. an intermediate layer comprising extruded polyolefin layers, adhesive layers, an ethylene/vinyl alcohol copolymer (EVOH) layer, wherein the EVOH layer is an extruded core layer, on both sides thereof, sandwiched between two layers of the extruded adhesive layers, and wherein each layer of said two layers of the extruded adhesive layers is laminated with one of the two extruded polyethylene layers; and C. an inner polyolefin layer, in which the outer polyolefin layer, the intermediate layer and the inner polyolefin layer are laminated by a co-extrusion lamination, wherein each of the outer and inner polyolefin layers is a co-extruded blown film selected from the group consisting of high density polyethylene (HDPE), linear low density polyethylene (LLDPE), low density polyethylene (LDPE) and combinations thereof.

preferably the outer or inner polyethylene film is a co-extrusion blown film with 1 to 3 layers or more, the outer and inner polyethylene layers preferably are flexible.

Each of the outer and inner polyolefin layers may be a multilayer film having the same or different thickness, wherein the thicknesses of said polyolefin layers are in the range of 90-200 microns, preferably the outer polyolefin layer has a thickness in the range of 120-200 microns, and the inner polyolefin layer has a thickness in the range of 90-165 microns.

The extruded polyolefin in B is selected from the group consisting of linear low density polyethylene (LLDPE), low density polyethylene (LDPE) and combinations thereof, the extruded polyethylene layers in B are preferably made from a polyethylene resin having a density of 0.90-0.92 g/cc, and the extruded polyethylene layers in B are more preferably made from a polyethylene resin having a density of 0.903-0.945 g/cc.

Each of the extruded polyolefin layers in B may have a thickness between 20-40 microns, preferably 20-30 microns.

The ethylene/vinyl alcohol copolymer (EVOH) has an ethylene content from 27 mole % to 48 mole %.

The adhesive layer is an anhydride-modified low-density polyethylene resin containing anhydride.

In this invention, the thicknesses of the EVOH layer, the adhesive layer, the extruded LLDPE layer and the PE film can be the same or different, for a good example, however the thicknesses of the EVOH layer and the adhesive layer are about 10-50 and 10-40 microns, respectively, preferably 10-30 and 10-20 microns, respectively. For the extruded LLDPE layer and the PE film, the thicknesses are about 20-40 and 90-200 microns, respectively.

In one embodiment of this invention, it provides:

i. a body part made from a laminate comprising

A. an outer polyolefin layer,

B. an intermediate layer comprising extruded polyolefin layers, adhesive layers, an ethylene/vinyl alcohol copolymer (EVOH) layer, wherein the EVOH layer is an extruded core layer sandwiched between the two extruded adhesive layers on both sides, and wherein said two extruded adhesive layers are laminated with the two extruded polyethylene layers, and C. an inner polyolefin layer; and ii. a shoulder of a laminated tube container formed from a layer of a melt-blended resin composition comprising (a) high density polyethylene (HDPE), (b) linear low density polyethylene (LLDPE), and/or low density polyethylene (LDPE), in which a compounding ratio by weight of the components (a) and (b) is 60 to 95:40 to 50.

A head part of the tube can be formed by means of injection molding and in compression molding procedures.

The following part explains this invention in details by way of examples, however this invention is not considered to be limited to these illustrative examples.

Example 1

KPL-PBL-01: Outer LLDPE Film 120/Extruded LLDPE Layer 27.5/Adhesive 10/EVOH 15/Adhesive 10/Extruded LLDPE Layer 27.5/Inner LLDPE Film 90

The inner polyethylene film having a thickness of 90 microns is laminated to the outer polyethylene film having a thickness of 120 microns by using co-extrusion of hot-melted LLDPE, adhesive and an EVOH resin. During the co-extrusion lamination procedure, the formed 5-layer film is obtained with a structure of Extruded LLDPE Layer 27.5/Adhesive 10/EVOH 15/Adhesive 10/Extruded LLDPE Layer 27.5.

Example 2

KPL-PBL-02: Outer LLDPE Film 200/Extruded LLDPE Layer 27.5/Adhesive 10/EVOH 15/Adhesive 10/Extruded LLDPE Layer 27.5/Inner LLDPE Film 90

The inner polyethylene film having a thickness of 90 microns is laminated to the outer polyethylene film having a thickness of 200 microns by using co-extrusion of hot-melted LLDPE, adhesive and an EVOH resin. During the co-extrusion lamination procedure, the formed 5-layer film is obtained with a structure of Extruded LLDPE Layer 27.5/Adhesive 10/EVOH 15/Adhesive 10/Extruded LLDPE Layer 27.5.

Example 3

KPL-PBL-03: Outer LLDPE Film200/Extruded LLDPE Layer 30/Adhesive 10/EVOH15/Adhesive 10/Extruded LLDPE Layer 30/Inner LLDPE Film 165

The inner polyethylene film having a thickness of 165 microns is laminated to the outer polyethylene film having a thickness of 200 microns by using co-extrusion of hot-melted LLDPE, adhesive and an EVOH resin. During the co-extrusion lamination procedure, the formed 5-layer film is obtained with a structure of Extruded LLDPE Layer 30/Adhesive 10/EVOH 15/Adhesive 10/Extruded LLDPE Layer 30.

Comparative Example 1

Outer LLDPE Film 170/Adhesive 25/EVOH 27/Adhesive 23/Inner LLDPE Film 245

A co-extrusion procedure for a 5-layered tube with a barrier layer and symmetric layer composition is used to produce a co-extruded tube with a structure of LLDPE 170/Adhesive 25/EVOH 27/Adhesive 23/LLDPE 245.

The present invention also provides a manufacturing process of a laminated tube. Firstly, a 3-layered LLDPE film is produced by using a co-extruded blown film. The Outer and inner LLDPE films can be the same or different. Moreover, the outer film should maintain stiffness and heat sealing properties, whereas the inner film should provide a good heat-sealing property. Secondly, a 5-layered laminate is produced by using a co-extrusion lamination process. The inner polyethylene film is laminated to the outer polyethylene film by using a co-extrusion of hot-melted LLDPE, adhesive, and an EVOH resin. The manufacturing process in this invention uses general available machines such as a co-extruded blown film manufacturing line, a co-extrusion lamination line, a laminated tube forming line and a head-part manufacturing line.

Oxygen transmission rate (OTR) and water vapor transmission rate (WVTR) are shown in Table 1. The OTR and WVTR were evaluated in accordance with ASTM D3985 and ASTM F1249, respectively.

TABLE 1

OTR and WVTR of Laminates

| Examples | Thickness microns | OTR at 23° C., 0% RH cc/m$^2$ · day | WVTR at 38° C., 90% RH g/m$^2$ · day |
|---|---|---|---|
| KPL-PBL-01 | 300 | 1.680 | 0.768 |
| KPL-PBL-02 | 380 | 0.979 | 0.548 |
| KPL-PBL-03 | 460 | 0.453 | 0.478 |
| Comparative Example 1 | 490 | 1.520 | 0.466 |

KPL-PBL-01, KPL-PBL-02 and KPL-PBL-03 are polymer barrier laminates of this invention. The oxygen gas transmission rate (OTR) and water vapor transmission rate (WVTR) of all laminate sheets are clearly shown in Table 1. KPL-PBL-02 exhibits the higher oxygen barrier property (the lower OTR value) than that of KPL-PBL-01 by 42%, because the total thickness of the laminate is increased from 300 to 380 microns. KPL-PBL-03 exhibits the higher oxygen barrier property (the lower OTR value) than that of KPL-PBL-02 by 54%, because the total thickness of the laminate is increased from 380 to 460 microns.

In this invention, the variation of the outer and inner films is used to provide several total thicknesses in order to obtain stability of the tube with the tube diameter in the range from 13 to 50 mm. It seems that a slight increase of the thicknesses of the outer and inner films will enhance the OTR barrier property. However, the thickness of the EVOH in the laminate is not varied, because there is a small change in the OTR value when the thickness of the EVOH layer is changed from about 15 to 30 microns. The OTR value of KPL-PBL-03 is three times higher than that of the comparative example 1.

The invention claimed is:

1. A laminated tube comprising:
    (a) a body part comprising a laminate comprising:
        (i) an outer polyolefin layer comprising a multilayer film;
        (ii) an intermediate layer comprising a plurality of extruded polyolefin layers, a plurality of extruded adhesive layers, and an ethylene/vinyl alcohol copolymer (EVOH) layer, wherein the EVOH layer is an extruded core layer, sandwiched between two of the extruded adhesive layers, and wherein each layer of said two extruded adhesive layers is laminated with one of the plurality of extruded polyolefin layers; and
        (iii) an inner polyolefin layer comprising a multilayer film, and
    (b) a shoulder, adhered to said body part, which is formed from a layer of a melt-blended resin composition comprising (i) high density polyethylene (HDPE), (ii) linear low density polyethylene (LLDPE), and/or low density polyethylene (LDPE), wherein a compounding ratio by weight of the components b(i) and b(ii) is 60 to 95:40 to 50;

wherein the outer polyolefin layer, the intermediate layer and the inner polyolefin layer of the body part are laminated by a co-extrusion lamination, wherein the body part comprising the laminate has a tendency to bounce back to its original shape when the body part is squeezed, the outer polyolefin layer having a thickness of 120-200 microns, the inner polyolefin layer having a thickness of 90-165 microns, each of the plurality of extruded polyolefin layers in the intermediate layer having a thickness of 20-30 microns, each of the extruded adhesive layers having a thickness of 10-20 microns and the EVOH layer having a thickness of 10-30 microns.

2. The laminated tube according to claim 1, wherein each of the outer and inner polyolefin layers is a co-extruded blown film selected from the group consisting of high density polyethylene (HDPE), linear low density polyethylene (LLDPE), low density polyethylene (LDPE) and combinations thereof.

3. The laminated tube according to claim 1, wherein the extruded polyolefin is selected from the group consisting of linear low density polyethylene (LLDPE), low density polyethylene (LDPE) and combinations thereof.

4. The laminated tube according claim 1, wherein the extruded polyolefin is polyethylene having a density of 0.90-0.92 g/cc.

5. The laminated tube according to claim 1, wherein the adhesive is an anhydride-modified low-density polyethylene resin containing anhydride.

6. The laminated tube according to claim 1, wherein the laminate has a total thickness of 300-460 microns.

* * * * *

UNITED STATES PATENT AND TRADEMARK OFFICE
CERTIFICATE OF CORRECTION

| | | |
|---|---|---|
| PATENT NO. | : 11,167,534 B2 | |
| APPLICATION NO. | : 16/080218 | |
| DATED | : November 9, 2021 | |
| INVENTOR(S) | : Sumet Limatibul | |

It is certified that error appears in the above-identified patent and that said Letters Patent is hereby corrected as shown below:

On the Title Page

(54) Title, and in the Specification, Column 1, Lines 1-2:
"POLYMER BARRIER LIMINATE TUBE FOR CONTAINER"

Should read as:
-- POLYMER BARRIER LAMINATE TUBE FOR CONTAINER --

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*